(12) United States Patent
Sugino

(10) Patent No.: US 8,243,180 B2
(45) Date of Patent: Aug. 14, 2012

(54) IMAGING APPARATUS

(75) Inventor: Yoichi Sugino, Osaka (JP)

(73) Assignee: Panasonic Corporation, Osaka (JP)

( * ) Notice: Subject to any disclaimer, the term of this patent is extended or adjusted under 35 U.S.C. 154(b) by 442 days.

(21) Appl. No.: 12/633,087

(22) Filed: Dec. 8, 2009

(65) Prior Publication Data

US 2010/0149400 A1    Jun. 17, 2010

(30) Foreign Application Priority Data

Dec. 12, 2008  (JP) ................................ 2008-317335

(51) Int. Cl.
H04N 5/222 (2006.01)
H04N 5/225 (2006.01)
H04N 5/228 (2006.01)
G06K 9/00 (2006.01)

(52) U.S. Cl. .............. 348/333.04; 348/169; 348/208.14; 382/103

(58) Field of Classification Search .................. None
See application file for complete search history.

(56) References Cited

U.S. PATENT DOCUMENTS

| | | | | |
|---|---|---|---|---|
| 2002/0140814 A1* | 10/2002 | Cohen-Solal et al. | ........ | 348/172 |
| 2005/0018066 A1* | 1/2005 | Hofer | ...................... | 348/333.02 |
| 2007/0064977 A1* | 3/2007 | Nagata | .......................... | 382/107 |
| 2007/0115363 A1* | 5/2007 | Nakamura | ............... | 348/208.14 |
| 2008/0002028 A1* | 1/2008 | Miyata | .......................... | 348/169 |
| 2008/0218596 A1* | 9/2008 | Hoshino | ..................... | 348/222.1 |
| 2008/0278589 A1* | 11/2008 | Thorn | ....................... | 348/208.14 |

FOREIGN PATENT DOCUMENTS

JP    2007-336400 A    12/2007

* cited by examiner

*Primary Examiner* — Justin P Misleh

(74) *Attorney, Agent, or Firm* — Pearne & Gordon LLP

(57) ABSTRACT

An imaging apparatus has an optical system that forms an optical image of a subject field and can vary a magnification of the optical image; an imaging section that converts the optical image formed by the optical system, into an electrical image signal; a display section that displays an image taken by the imaging section; a subject detecting section that detects a main subject in the image taken by the imaging section; a framing controlling section that controls framing based on information about a position of the main subject detected in the subject detecting section; a controlling section that selectively executes one of a first framing support mode that presents on the display section a display that supports the framing based on the information about the position of the main subject detected in the subject detecting section, and a second framing support mode that operates the framing controlling section based on the information about the position of the main subject detected in the subject detecting section; and a switching section that switches between the first framing support mode and the second framing support mode.

15 Claims, 10 Drawing Sheets

IMAGING APPARATUS

CROSS REFERENCE TO RELATED APPLICATIONS

The disclosure of Japanese Patent Application No. 2008-317335, filed on Dec. 12, 2008, including the specification, drawings and abstract, is incorporated herein by reference in its entirety.

TECHNICAL FIELD

The technical field relates to an imaging apparatus. More particularly, the technical field relates to an imaging apparatus with a subject tracking function.

BACKGROUND ART

Conventionally, a technique of finding features of a subject specified by a camera user (hereinafter "user") or a subject specified by an imaging apparatus based on predetermined conditions, these subject being hereinafter referred to as "main subject," and estimating the area in image data where the main subject is present based on the features, is known. Particularly, the process of finding in a serial manner the area where the main subject is present in moving image data comprising image data that is inputted on a continuous basis, is carried out to follow the moving main subject, and therefore is often referred to as "tracking process" or "chasing process." Note that the process of following a main subject in moving image data will be referred to as "tracking" with the present invention.

Various types of imaging apparatuses that find the position of a main subject by such a tracking process and that performs shooting control for shooting the main subject adequately, including focus control for focusing on the main subject, exposure control for adjusting the color value of the main subject to an adequate level and framing control for adjusting the shooting range, are proposed (for example, see Patent Literature 1). Usually, in framing control, panning, tilting and zooming are performed such that the main subject is placed in the center of the screen.

FIG. 1 is a flowchart showing a process of switching between two subject detection modes in an imaging apparatus with an automatic tracking function disclosed in Patent Literature 1.

In FIG. 1, after the imaging apparatus is powered on, upon selecting shooting mode in step S1, the user is able to use an operating means equipped in the imaging apparatus to select whether to operate the imaging apparatus in normal mode in step S2 or operate the imaging apparatus in tracking mode in step S3. It is possible to execute this selection when necessary before the imaging apparatus is powered off in step S4.

The imaging apparatus disclosed in Patent Literature 1 that has such a function of selecting operation modes, has a subject detecting section and a switching section. The subject detecting section can detect a main subject from an image that is taken. The switching section switches between normal mode and tracking mode. In normal mode, the subject detecting section detects the main subject from the image that is taken. In tracking mode, the subject detecting section detects the main subject by targeting a recognition area, which is part of an image that is taken.

Normal mode refers to mode for, for example, performing a face detection process to detect one or more faces from an image that is taken. Tracking mode refers to mode for, for example, detecting a face in a recognition area in which the default state of a recognition area is set in the center of an image and then changing the position of the recognition area to follow the position of the face detected in the recognition area. In normal mode, faces having features registered in an imaging apparatus and faces of higher priority to which weight has been assigned based on information about the size, position and so on are automatically detected. On the other hand, in tracking mode, a face that is not registered yet in an imaging apparatus, and a face of a high interest to users although its priority is low, can be detected.

The imaging apparatus disclosed in Patent Literature 1 is configured to use results of subject detection in automatic focus adjustment control and automatic exposure control in any mode of normal mode and tracking mode. Further, the imaging apparatus disclosed in Patent Literature 1 has a pan head that supports this imaging apparatus, and the result of subject detection is used to control this pan head based on the position in the image taken where the subject is detected, and is used to perform framing control such that the main subject is placed in the center of the screen.

CITATION LIST

Patent Literature

Patent Literature 1: Japanese Patent Application Laid-Open No. 2007-336400

SUMMARY

Technical Problem

However, the imaging apparatus disclosed in Patent Literature 1 is directed to switching related to a method of detecting a subject, and its shooting function operating based on information about the position of the subject, which is the result of subject detection, is fixed.

There are various shooting functions that utilize information about the detected position of the subject, such as automatic focus adjustment control, automatic exposure control or framing control, and which shooting function is the most effective function varies depending on shooting environment or the intension of the user. For example, there may be users who want to automate the framing control by controlling the pan head to alleviate burdens of shooting and users who do not need automatic shooting operations and wish to use results of subject detection in automatic focus adjustment control and automatic exposure control alone. There has never been a means for making it possible to select in which shooting function these results of subject detection are used has never been provided so far.

An object is to provide an imaging apparatus that enables shooting in a more flexibile fashion according to the user intension of shooting.

Solution to Problem

To achieve the above object, an imaging apparatus has an optical system that forms an optical image of a subject field and can vary a magnification of the optical image; an imaging section that converts the optical image formed by the optical system, into an electrical image signal; a display section that displays an image taken by the imaging section; a subject detecting section that detects a main subject in the image taken by the imaging section; a framing controlling section that controls framing based on information about a position of the main subject detected in the subject detecting section; a controlling section that selectively executes one of a first framing support mode that presents on the display section a display that supports the framing based on the information about the position of the main subject detected in the subject detecting section, and a second framing support mode that operates the framing controlling section based on the information about the position of the main subject detected in the subject detecting section; and a switching section that switches between the first framing support mode and the second framing support mode.

Advantageous Effects

This apparatus enables shooting in a more flexibile fashion according to the user's intension of shooting.

DESCRIPTION OF EMBODIMENTS

Embodiments of the present invention will be explained in detail below with reference to the accompanying drawings. Note that an example will be explained with each embodiment where a video camera is employed as an imaging apparatus.

Embodiment 1

Figure 1:
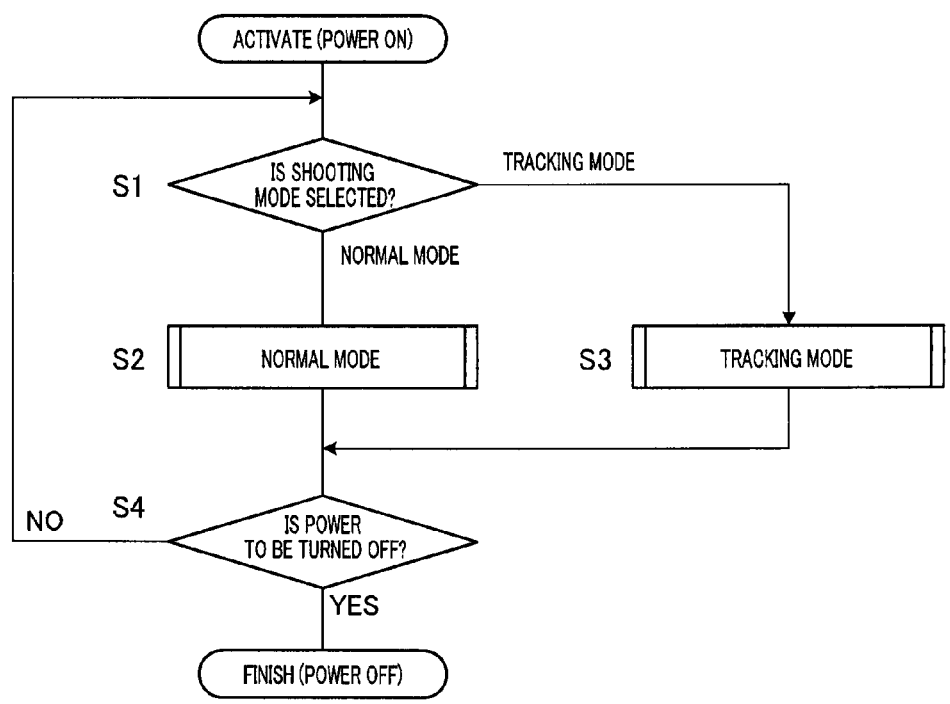
FIG. 1 is a flowchart showing a process of switching between two subject detection modes in a conventional imaging apparatus.
Figure 2:
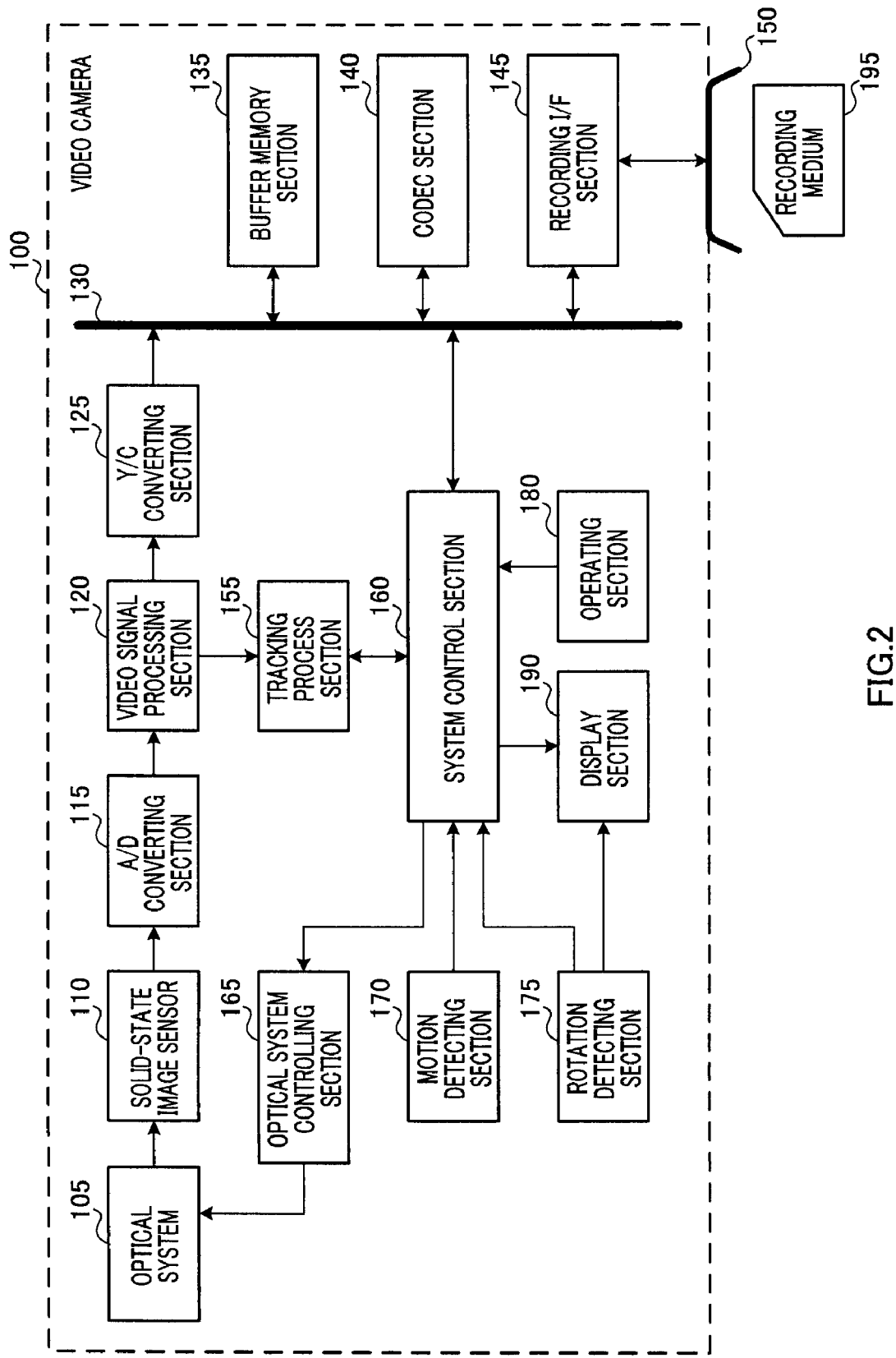
FIG. 2 is a block diagram showing a configuration of a video camera of an imaging apparatus according to Embodiment 1 of the present invention.

FIG. 2 is a block diagram showing the configuration of a video camera as an imaging apparatus according to Embodiment 1 of the present invention.

In FIG. 2, video camera 100 has optical system 105, solid-state image sensor 110, analogue-to-digital (A/D) converting section 115, video signal processing section 120, Y/C converting section 125, system bus 130, buffer memory section 135, codec section 140, recording interface (I/F) section 145, socket 150, tracking processing section 155, system control section 160, optical system controlling section 165, motion detecting section 170, rotation detecting section 175, operating section 180 and display section 190.

Optical system 105 is formed by arranging a plurality of lenses, an aperture section that performs exposure control, shutter apparatus and so on (although not shown), inside a lens barrel that can be controlled to drive in the pitching direction and in the yawing direction. The lenses forming optical system 105 include a focus lens which moves along the optical axis to adjust the focus adjustment state and a zoom lens which moves along the optical axis to vary the magnification of an optical image of a subject field including the subject. The lens barrel can adjust the direction of the optical axis in a predetermined range, by controlling the lens barrel controlling section (described later) to drive. The optical image of a subject field is formed on solid-state image sensor 110 through optical system 105.

Solid-state image sensor 110 converts the optical image formed by imaging optical system 105 into an electrical signal (i.e. analogue video signal). For solid-state image sensor 110, for example, a CCD (Charge Coupled Device) image sensor or a CMOS (Complementary Metal Oxide Semiconductor) image sensor is used.

A/D converting section 115 converts an analogue video signal outputted from solid-state image sensor 110, into a digital video signal.

Video signal processing section 120 carries out common video signal processes such as gain adjustment, noise cancellation, gamma correction, aperture process and knee process for the digital video signal outputted from A/D converting section 115, and generates an RGB format digital video signal as video data. The generated video data is outputted to Y/C converting section 125 and tracking processing section 155.

That is, optical system 105, solid-state image sensor 110, A/D converting section 115 and video signal processing section 120 form an imaging section that receives as input an optical image of a subject field in solid-state image sensor 110 through optical system 105 to generate a digital video signal as video data from the received optical image.

Y/C converting section 125 converts the format of the digital video signal generated in video signal processing section 120 from the RGB format to the Y/C format. The digital video signal converted into the Y/C format in Y/C converting section 125 is outputted to buffer memory section 135 through system bus 130.

Buffer memory section 135 stores the digital video signal outputted from Y/C converting section 125 or codec section 140, as digital video information on a temporary basis.

Codec section 140 generates compressed video data of a predetermined format such as MPEG-2 (Moving Picture Experts Group phase 2) or H.264/MPEG-4 AVC (Moving Picture Experts Group phase 4 Part 10 Advanced Video Coding) by acquiring digital video information stored in buffer memory section 135 through system bus 130 and applying a lossy compression process to the acquired digital video information. Further, codec section 140 records the generated compressed video data in recording medium 195 electrically connected with socket 150 through system bus 130 and recording I/F section 145.

Furthermore, codec section 140 generates a digital video signal by acquiring the compressed video data recorded in recording medium 195 electrically connected with socket 150 and applying an extension process with respect to the acquired compressed video data. Codec section 140 outputs the generated digital video signal to buffer memory section 135 through system bus 130.

That is, codec section 140 and recording I/F section 145 form a recording section that has the function of recording the video data generated in the above imaging section, in recording medium 195 and the function of taking in video data recorded in recording medium 195, into video camera 100.

Further, although, with the present embodiment, recording medium 195 is a removable media that can be inserted in and removed from socket 150, recording medium 195 may be a hard disc built in video camera 100.

Tracking processing section 155 as the tracking section generates image data in a serial manner by adequately applying an image downsizing process to the RGB format digital video signals generated as video data in video signal processing section 120, and stores each generated image data in an internal memory (not shown).

Further, when tracking mode is validated, tracking processing section 155 executes a predetermined process (i.e. tracking process) for tracking the main subject in the subject field, based on each image data stored inside. The tracking process may include various processes including, for example, changing the shooting area such that the main subject is accommodated in the shooting area and optimizing the shooting conditions for the specific main subject (for example, AF and AE described later). Tracking processing section 155 extracts various features from each image data stored inside, and performs tracking process based on the extracted features.

Here, extraction of features will be explained. Tracking processing section 155 can extract various features from image data according to a known method.

An example of extracted features includes the brightness level value in a specific area in image data specified by system control section 160. This brightness level value is used to perform exposure control. Based on this brightness level value, the aperture and shutter speed of optical system 105 are adjusted.

Another example of the extracted features is high frequency component information in a specific area in image data specified by system control section 160. This high frequency component information is used to perform focus control. High frequency components included in a video signal is associated with the degree of focus adjustment, and takes the maximum value in a focus point. There, with the focus adjustment detection scheme generally known as the "hill-climbing method," the operation of detecting focus adjustment is performed by moving the focus lens and zoom lens forming optical system 105 and finding the maximum value for the high frequency components.

The above exposure control and focus control are performed by system control section 160, and control information is reported to optical system controlling section 165, such that optical system controlling section 165 controls optical system 105.

Figure 3:
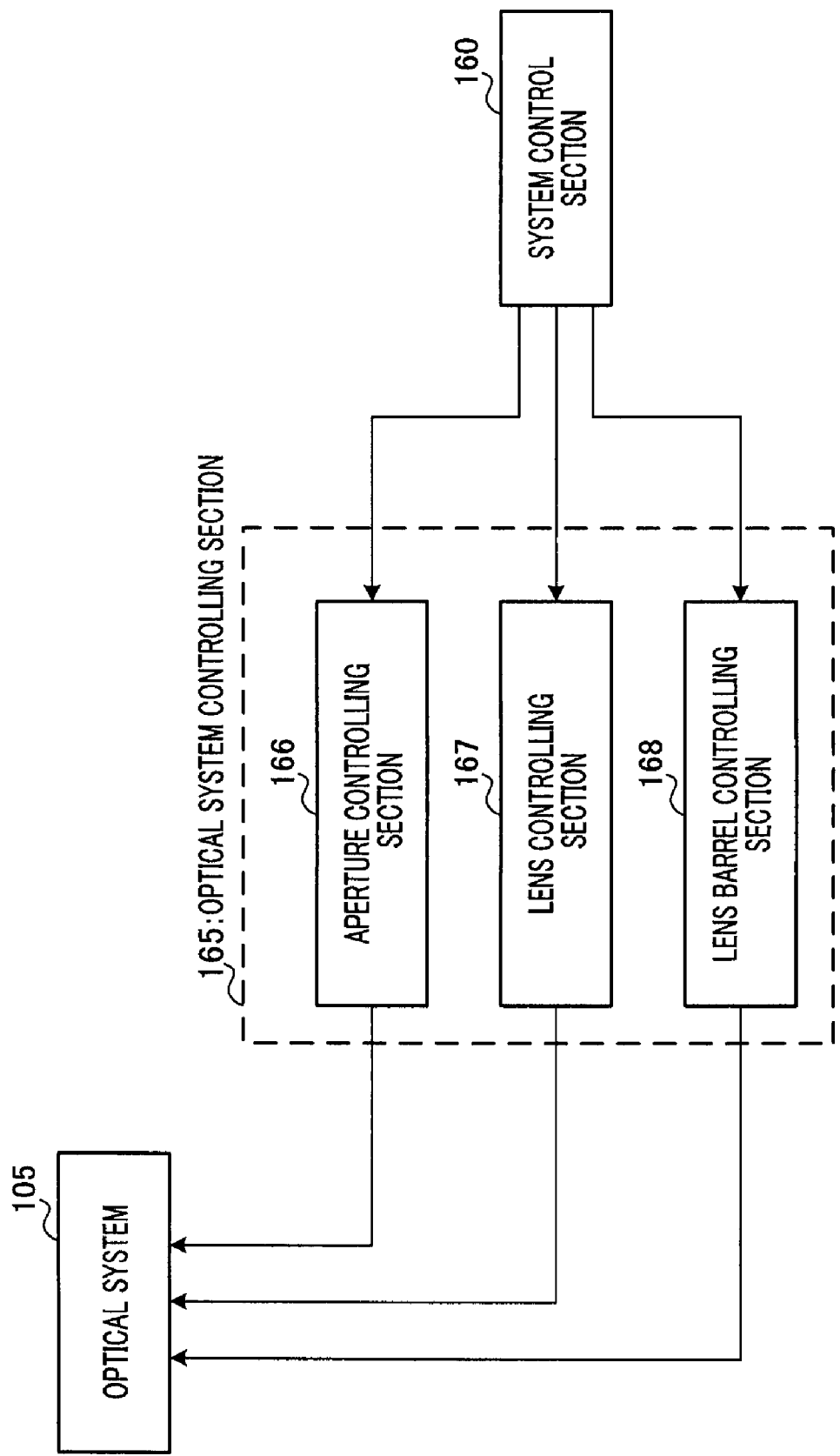
FIG. 3 is a block diagram showing one example of a configuration of the optical system controlling section shown in FIG. 2.

FIG. 3 is a block diagram showing one example of a configuration of optical system controlling section 165.

In FIG. 3, optical system controlling section 165 has aperture controlling section 166, lens controlling section 167 and lens barrel controlling section 168.

To be more specific, when tracking processing section 155 extracts the brightness level value in a specific area, system control section 160 calculates an optimal aperture value based on the extracted brightness level value and reports the degree of aperture control to aperture controlling section 166 in optical system controlling section 165, based on the calculated aperture value. Aperture controlling section 166 adjusts the aperture of optical system 105 by driving the aperture adjusting apparatus and shutter apparatus provided in optical system 105, based on the degree of aperture control reported from system control section 160.

Further, when tracking processing section 155 extracts high frequency component information in a specific area, system control section 160 determines the degree of lens control for controlling the focus lens and zoom lens forming optical system 105, based on the extracted high frequency component information, and reports the determined degree of lens control to lens controlling section 167 in optical system controlling section 165. Lens controlling section 170 drives the focus lens and zoom lens forming optical system 105, based on the degree of lens control reported from system control section 160.

Further, according to a framing process (descried later), when the range of shooting is changed based on the position of the main subject, the center coordinate of the main subject area in an input image is reported to system control section 160 from tracking processing section 155, and system control section 160 reports the degree of lens barrel control in the yawing direction and in the pitching direction, to lens barrel controlling section 168 in optical system controlling section 165 such that the center coordinate of the main subject area is placed in the center of the screen. Lens barrel controlling section 168 controls the lens barrel forming optical system 105 to drive, based on the degree of lens barrel control reported from system control section 160.

Next, a process of extracting a main subject area will be explained.

Tracking processing section 155 can extract an area (hereinafter "subject area") in image data where the possibility that the main subject is present is high, based on features of the main subject set in advance. Although such a process is generally referred to as "subject detection," there are cases where this process is referred to as "subject identification" or "subject recognition."

There are two cases where features of the main subject such as features representing a face are held in a fixed manner in tracking processing section 155 and where features are generated dynamically by calculating features from part of an area in an image corresponding to the default tracking position when tracking starts.

As a method of extracting a subject area, for example, tracking processing section 155 uses the pixel values of a pixel group as features and compares between areas of an input image on a per pixel basis to determine the most similar candidate area as the subject area, in a plurality of subject area candidates set in image data. This method is generally referred to as "template matching."

Further, instead of pixel values, color histograms indicating the distribution of colors in the image area may be used as features. In this case, tracking processing section 155 selects an area group of subject area candidates from an input image, creates color histograms for the selected area group, calculates the similarity between the created color histograms using the histogram intersection method, and, as a result of calculation, determines the image area showing the highest matching rate as the subject area.

Here, an area group of subject area candidates are selected from, for example, a predetermined range of the area around the position of the previously extracted subject area. This is based on the assumption that the main subject does not move significantly in a short period of time, and it is possible to reduce the amount of processes and improve the accuracy of detection by neglecting similar subjects that are present in positions apart from the main subject.

Further, a profile may be used, or motion information using an inter-frame difference may be used for features.

Further, known Wavelet features such as Gabor and Haar-Like features may be used for features. Moreover, features acquired by prior learning using a sample image according to a detection target such as the face or body of a person, or a specific person or object may be used for features. In this case, based on the acquired features, tracking processing section 155 extracts the area as the subject area where the detection target is present, from an input image.

Various techniques related to the above-described subject detection are conventionally studied and developed. The present invention does not depend on specific features or subject detection methods, so that it is possible to use arbitrary features and subject detection methods, and it is also possible to use a plurality of techniques in combination.

Further, when receiving commands from system control section 160, tracking processing section 155 dynamically creates features that do not require prior learning using sample images such as color histograms and image templates. Dynamic creation of features will be described below.

Motion detecting section 175 detects the motion of video camera 100. Motion detecting section 175 is formed with, for example, an angular velocity sensor and A/D converter (although not shown). System control section 160 can detect the motion of video camera 100 in the yawing direction and pitching direction, based on the output of the angular velocity sensor of motion detecting section 175. By this means, it is possible to decide, for example, whether or not video camera 100 is held in a hand and whether or not the user holding video camera 100 is still.

To be more specific, in motion detecting section 170, two pairs of angular velocity sensors and A/D converters are provided for motion detection in the yawing direction and for motion detection in the pitching direction. The angular velocity sensors of motion detecting section 170 output two angular velocity signals of the yawing direction and the pitching direction. The two angular velocity signals outputted from the angular velocity sensors are each A/D converted in the A/D converters of motion detecting section 175, and are reported to system control section 160. System control section 160 applies highpass filtering to the two angular velocity signals to cut off low frequency components, and then integrates the angular velocity signals to acquire angular displacement signals. System control section 160 performs desired decision by comparing the angular velocity or angular displacement signal in the yawing direction with a threshold and comparing the angular velocity or angular displacement signal in the pitching direction with a threshold.

System control section 160 as a controlling section is formed with CPU (Central Processing Unit), ROM (Read Only Memory) that records a program and RAM (Random Access Memory) for executing the program (any one of these are not shown), and controls the operation of each section of video camera 100 through system bus 130.

To be more specific, when the user operates operating section 180, system control section 160 controls each section of video camera 100, particularly, the recording section formed with codec section 140 and recording I/F section 145, and the tracking section 155 formed with tracking processing section 155, according to operation information received as input from operating section 180 based on the operation by the user.

Further, system control section 160 acquires digital video information stored in buffer memory section 135 through system bus 130, generates display data by applying an image downsizing process to the acquired digital video information, outputs the generated display data to display section 190, and has display data displayed on the display screen of display section 190 as a video image. Consequently, when shooting mode is selected, buffer memory section 135 stores video data generated in the above imaging section and therefore display section 190 displays a live video image. Further, when playback mode is selected, buffer memory section 135 stores video data generated in the above recording section and therefore display section 190 displays past recorded video images.

IN generating display data, system control section 160 performs an image process of the display data generated such that various icons and so on that allow recording time information, battery level information and the functions during the operation to be intuitively understood are superimposed on a video image displayed on the display screen. Further, when operating section 180 is operated to request that a menu for various settings be displayed, system control section 160 performs an image process of display data such that the requested menu is displayed on the display screen. Furthermore, when a menu is selected and the operations of setting and setting reset are performed, system control section 160 performs an image process of display data according to these operations.

Display section 190 has a thin display panel such as a small LCD (Liquid Crystal Display) panel and an electric view finder ("EVF").

Operating section 180 is formed with a plurality of operating members. The user can operate operating section 180 looking at video images displayed on the small, thin display panel or EVF. When operating section 180 is operated, system control section 160 receives operation information as input from operating section 180.

The operating members are typically buttons and levers. When the operating members are buttons, the user performs the operation of pressing an operating member to change the released state (i.e. OFF state) of the button to the pressed state (i.e. ON state), and return the pressed state (i.e. ON state) of the button to the released state (i.e. OFF state).

Further, the operating members may include, for example, capacitive sensors that can detect that part of the body of a person touches the operating member. In case where operating section 180 has such a sensor, system control section 160 decides that the operating member is in the pressed state (i.e. ON state) when it is detected that part of the body of a person touches the operating member, and decides that the operating member is in the released state (i.e. OFF state) when part of the body of a person is not decided to touch the operating member.

That is to say, video camera 100 is operated by operating section 180 formed with various buttons and levers. The user gives various commands to video camera 100 through operating section 180 looking at video images that are being shot, in display section 190 represented by a small LCD panel or EVF. Video data displayed in display section 190 is created by system control section 160. System control section 160 downsizes image data stored in buffer memory section 135 to match the resolution of display section 190, superimposes various icons and so on that allow the operation state of video camera 100 to be intuitively understood, on the downsized video image and outputs this video image to display section 190.

Further, display section 190 is rotatable in predetermined directions. When the user rotates display section 190 in a predetermined direction, this is reported to system control section 160 from rotation detecting section 175.

Next, the method of specifying the main subject according to the present embodiment will be explained.

Figure 4A:
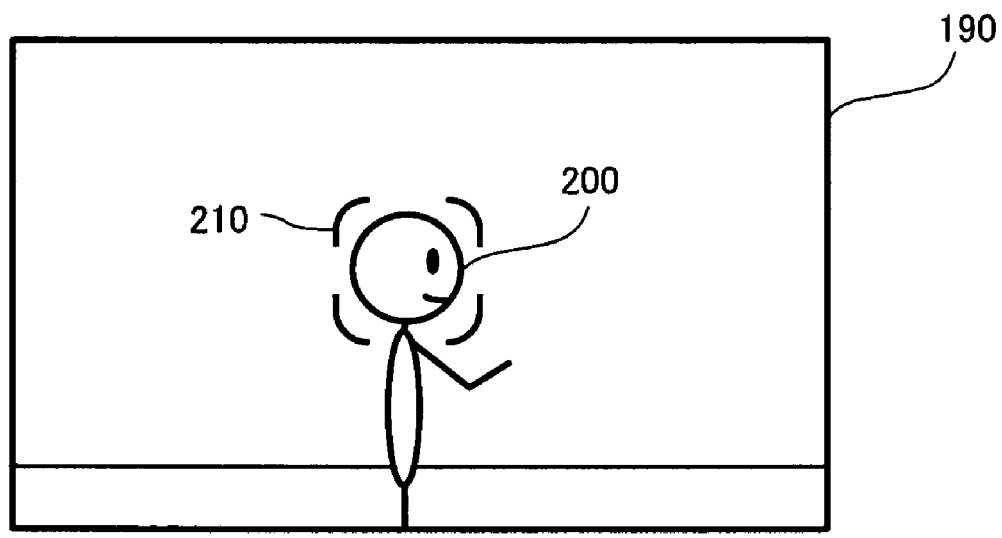
FIG. 4A and FIG. 4B show one example of display content in the display section according to the present embodiment, respectively.
Figure 4B:
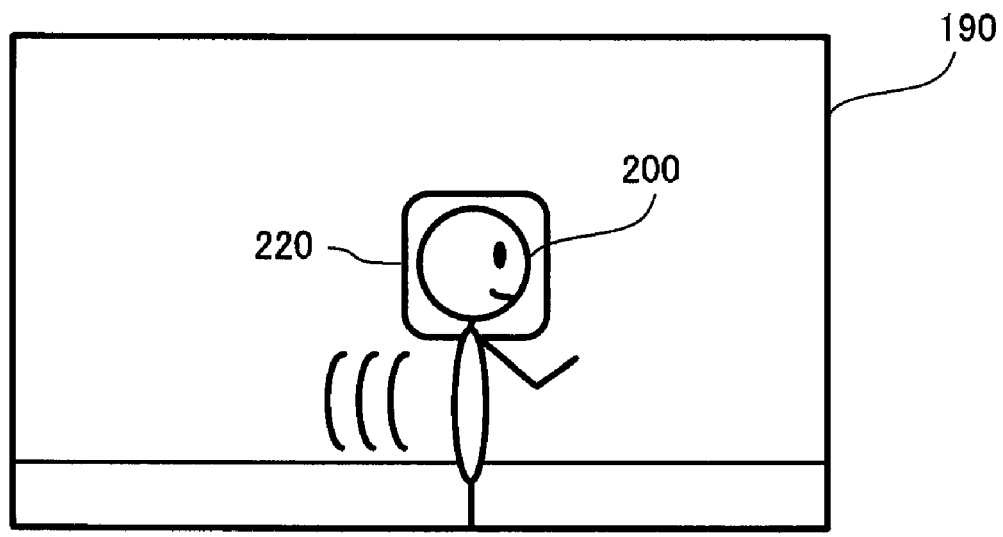

FIG. 4A and FIG. 4B show examples of display content in display section 190 according to the present embodiment. In FIG. 4A, specifying frame 210 is a frame display for specifying main subject 200, and is displayed in the center of the screen when tracking mode is validated. When the tracking button forming operating section 180 is pressed in a state main subject 200 is captured in specifying frame 210, tracking processing section 155 generates features used in a tracking process, based on image data matching the area in specifying frame 210.

When the tracking process is started, tracking frame 220 is superimposed on main subject 200 and is displayed as shown in FIG. 4B.

With the present embodiment, a switching means that switches to which one of a plurality of shooting functions to be performed the result of main subject detection is used, so that it is possible to select a shooting function to use a result of subject detection. By this means, a plurality of shooting functions executed based on the result of main subject detection can be validated or invalidated, so that shooting can be carried out in a more flexibile fashion according to the user's intension of shooting.

To be more specific, video camera 100 is configured with a plurality of framing support modes, and, when operating section 180 commands to start a tracking process, system control section 160 performs the operation in the framing support mode selected in advance. Instead of this, as will be described in other embodiments, system control section 160 acquires information from recording I/F section 145, motion detecting section 170 and rotation detecting section 175, and automatically selects an adequate framing support mode.

For example, with the present embodiment, video camera 100 has the first framing support mode and the second framing support mode. The first framing support mode presents a display to support framing based on information about the position of the main subject detected in tracking processing section 155. The second framing support mode executes a framing process based on information about the position of the main subject detected in tracking processing section 155. In the first framing support mode, the user can set framing with a certain degree of flexibility. By contrast with this, the second framing support mode is directed to alleviating burdens users take during shooting by means of automatic shooting. The details of the operation will be described later.

Next, the flow of a tracking process in video camera 100 having the above configuration will be explained using the flowchart shown in FIG. 5.

Figure 5:
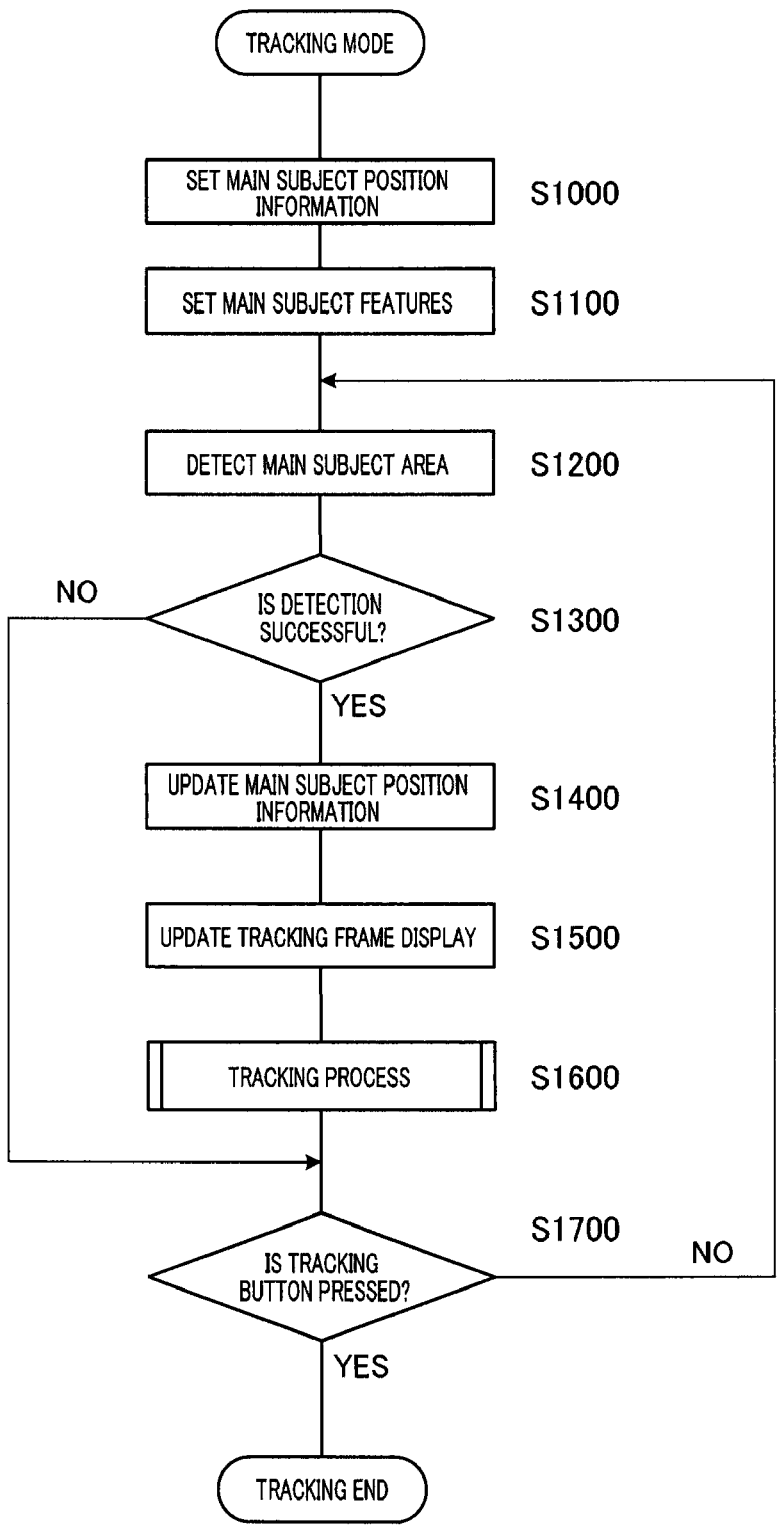
FIG. 5 is a flowchart showing the flow of a tracking process by a video camera according to the present embodiment.

The flowchart of FIG. 5 shows a process that is performed when the tracking button forming operating section 180 is pressed during recording or while recording stands by.

First, in step S1000, system control section 160 sets the position (i.e. coordinate) of specifying frame 210 shown in FIG. 4A as main subject position information.

Then, in step S1100, system control section 160 acquires features of a partial image in the position indicated by the main subject position information set in step S1000, that is, features of a partial image in specifying frame 210, according to the method that has already been described.

Further, in step S1000 and step S1100, information required to start a tracking process has been set. In the subsequent steps, based on the acquired information, the tracking process is executed.

Further, in step S1200, tracking processing section 155 detects the subject area. To be more specific, tracking processing section 155 extracts subject candidate areas from image data, based on the main subject position information set in step S1000 according to the method that has already been described, and selects the subject area that optimally matches features set in step S1100, from the subject candidate areas, as the subject area.

Then, in step S1300, system control section 160 decides whether or not a result of the subject area detection in step S1250 indicates success. As a result of this decision, if the result of the subject area detection indicates success (S1300: YES), the step proceeds to step S1400, and, if the result of the subject area detection does not indicate success (S1300: NO), the step proceeds immediately to step S1700.

In step S1400, system control section 160 updates main subject position information.

Then, in step S1500, system control section 160 updates a display for tracking frame 220 based on the main subject position information updated in step S1400.

Then, in step S1600, system control section 160 performs tracking process (described later) which is characteristics with the present embodiment.

Then, in step S1700, system control section 160 decides whether or not the tracking button forming operating section 180 is pressed. As a result of this decision, when the tracking button is pressed (S1700: YES), the tracking process is finished. By contrast with this, when the tracking button is not pressed (S1700: NO), the step returns to step S1200 to continue the tracking process.

Further, during the tracking process based on the flowchart shown in FIG. 5, tracking processing section 155 receives as input digital video signals occasionally from video signal processing section 120, and image data in the memory (not shown) in tracking processing section 155 is updated occasionally based on the input digital video signals.

Further, instead of the above content of the process, in step S1000 and step S1100, it may be possible that features stored in advance are read and an area having these features is extracted from a screen to specify the position of the extracted area as the first position of the main subject.

Figure 6:
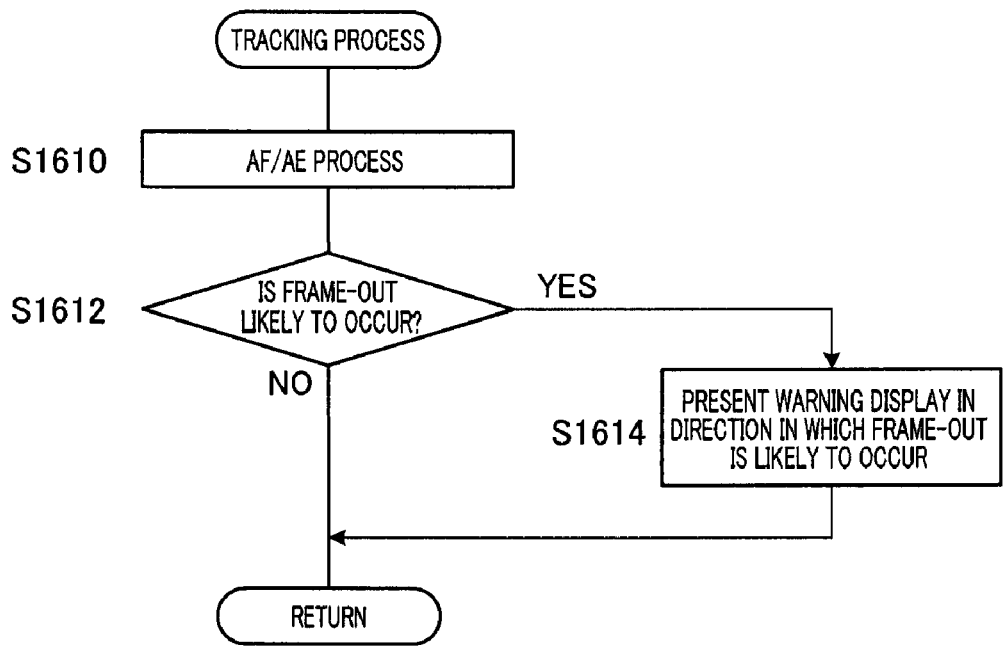
FIG. 6 is a flowchart showing one example of content of a tracking process in the first framing support mode according to the present embodiment.

FIG. 6 is a flowchart showing an example of content of a tracking process (step S1600) shown in FIG. 5. The tracking process shown in FIG. 6 shows one example of content of the operation of the tracking process in the first framing support mode.

First, in step S1610, system control section 160 performs an automatic focus ("AF") process and automatic exposure ("AE") process based on the main subject position information updated in step S1400, according to the method that has already been described.

Then, in step S1612, system control section 160 decides whether or not the main subject is about to go out of a frame to an outside of a range of the shooting area, based on the main subject position information updated in step S1400. This decision can be readily made by providing an area of a certain range around the outer periphery of image data stored in the memory (not shown) in tracking processing section 155, and checking whether or not the main subject is present in that area. As a result of this decision, if the main subject is about to go out of the frame (S1612: YES), the step proceeds to S1614, and, if the main subject is not about to go out of the frame (S1612: NO), the step returns to step S1700 of FIG. 5.

In step S1614, system control section 160 presents a warning display on display section 190 such that the user can understand the direction in which frame-out is likely to occur. Then, the process returns to step S1700 of FIG. 5.

Figure 7:
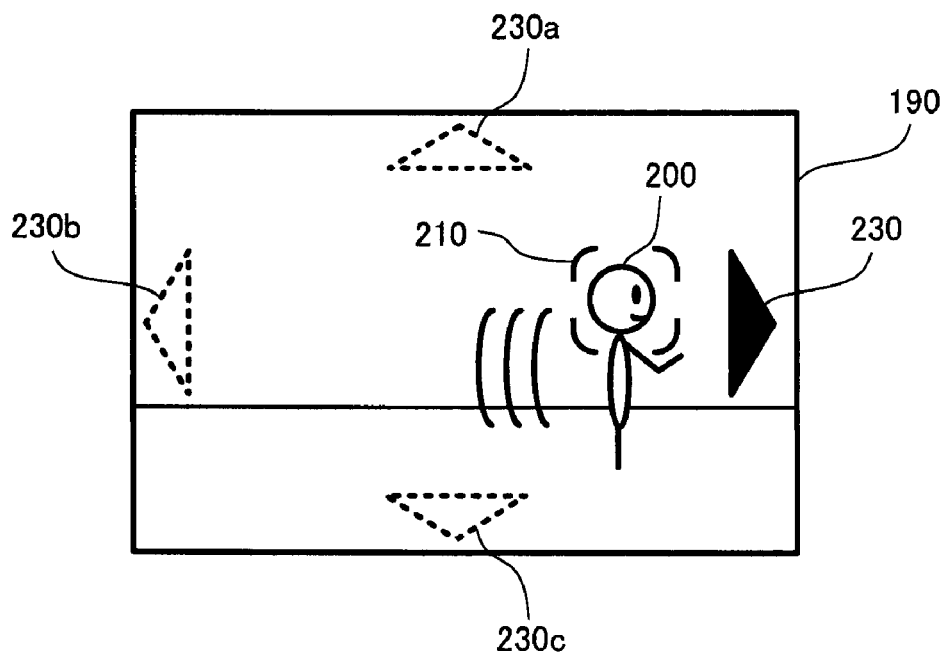
FIG. 7 shows one example of a frame-out warning display in the first framing support mode according to the present embodiment.

FIG. 7 shows one example of a warning display presented in step S1614 of FIG. 6.

FIG. 7 is a display example where it is decided that the main subject is about to go out of the frame in the right direction. Here, as shown in FIG. 7, warning display 230 is displayed in the right direction of the screen. When the main subject is about to go out of the frame in other directions, warning display 230a is displayed in case of the upward direction, warning display 230b is displayed in case of the left direction and warning display 230c is displayed in case of the downward direction.

Further, the color of warning display 230 may be changed or flashed to call for the user's attention. Further, a configuration is possible where more detailed patterns of warning display 230 are provided and displayed in oblique directions in addition, upward, downward, left and right directions.

Content of the operation of a tracking process in the first framing support mode has been described above. This process for notifying the user of the direction in which the main subject is about to go out of the frame can support the adjustment of framing, so that the usability of video camera 100 improves.

Figure 8:
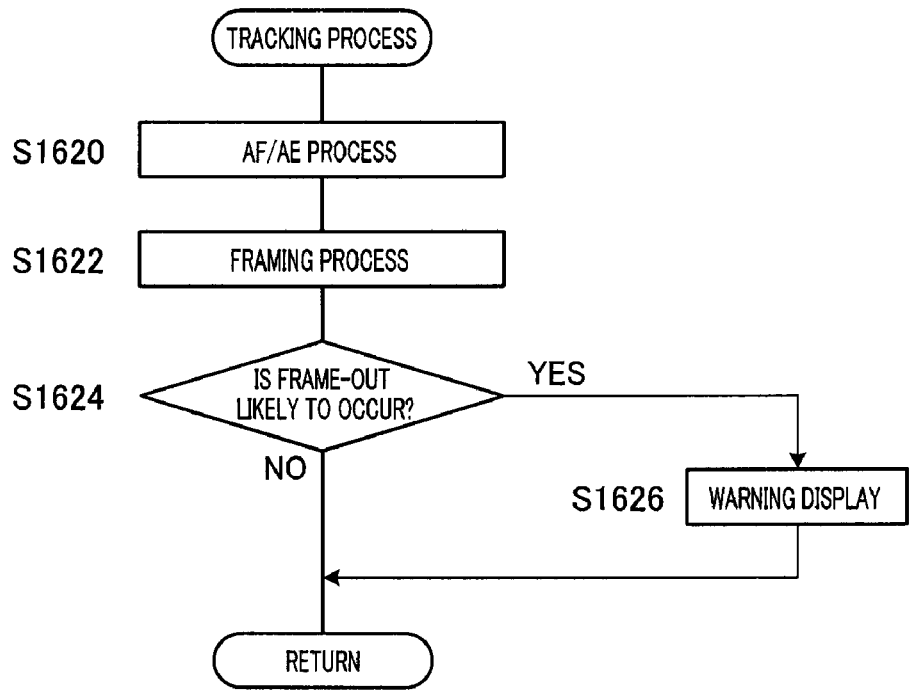
FIG. 8 is a flowchart showing one example of content of a tracking process in the second framing support mode according to the present embodiment.

FIG. 8 is a flowchart showing one example of content of a tracking process (step S1600) shown in FIG. 5. The tracking process shown in FIG. 8 is one example of content of the operation of a tracking process in the second framing support mode.

First, in step S1620, system control section 160 performs an automatic focus ("AF") process and automatic exposure ("AE") process based on main subject position information updated in step S1400, according to the method that has already been described.

Then, in step S1622, system control section 160 performs a framing process. To be more specific, system control section 160 performs a framing process such that the main subject is placed in the center of the shooting area as much as possible, based on the main subject position information updated in step S1400. For example, system control section 160 calculates the difference between the position of the main subject and the center of the shooting area, and reports the degree of lens barrel control to lens barrel controlling section 168 such that the calculated difference becomes zero. Lens barrel controlling section 168 controls the lens barrel forming optical system 105 to drive in the yawing direction and in the pitching direction, based on the degree of lens barrel control reported from system control section 160. The optical axis of optical system 105 changes by driving the lens barrel, so that the position of the main subject in the shooting area changes eventually.

However, to what degree the lens barrel of optical system 105 can be driven is limited and therefore cases might occur where the main subject goes out of the frame from the shooting area even if the lens barrel is driven. Accordingly, in order to prevent the main subject from going out of the frame, whether or not the main subject is about to go out of the frame is decided in step S1624. The content of this decision process is the same as the content of the decision process in step S1612 shown in FIG. 6.

That is, in step S1624, system control section 160 decides whether or not the main subject is about to go out of the frame to the outside of a range of the shooting area, based on the main subject position information updated in step S1400. This decision can readily be made by providing an area of a certain range around the outer periphery of image data stored in the memory (not shown) in tracking processing section 155, and checking whether or not the main subject is present in that area. As a result of this decision, if the main subject is about to go out of the frame (S1624: YES), the step proceeds to step S1626, and, if the main subject is not about to go out of the frame (S1624: NO), the step returns to step S1700 of FIG. 5 immediately.

In step S1626, system control section 160 presents a warning display on display section 190. Then, the process returns to step S1700 of FIG. 5.

Figure 9:
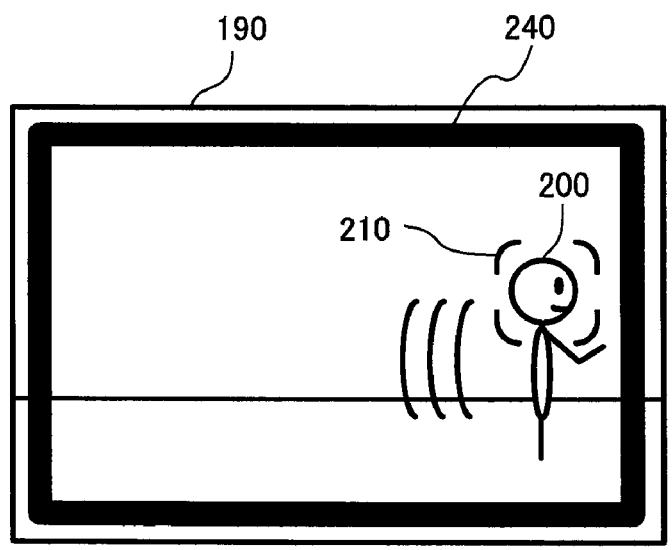
FIG. 9 shows one example of a frame-out warning display in the second framing support mode according to the present embodiment.

FIG. 9 shows one example of a warning display presented in step S1626 of FIG. 8.

With the example of FIG. 9, warning display 240 is different from warning display 230 (see FIG. 7) in the first framing support mode and does not indicate the direction in which the main subject goes out of the frame. Note that warning display 240 provides a more distinct display than warning display 230 in the first framing support mode.

The second framing support mode is directed to alleviating burdens users take during shooting by means of automatic shooting. Therefore, there may be cases where the user does not pay attention to the imaging apparatus (i.e. video camera 100) operating in the second framing support mode. For example, these are the cases where, instead of looking at display section 190, the user looks at the main subject directly during shooting. In these cases, it is important to communicate information that frame-out is likely to occur, as early as possible, to prevent shooting from failing, and the priority of presenting additional information such as the direction in which frame-out is likely to occur is low. Consequently, a large warning display in the second framing support mode is presented on the screen like warning display 240 shown in FIG. 9, such that the user can notice the warning display more reliably.

Figure 10A:
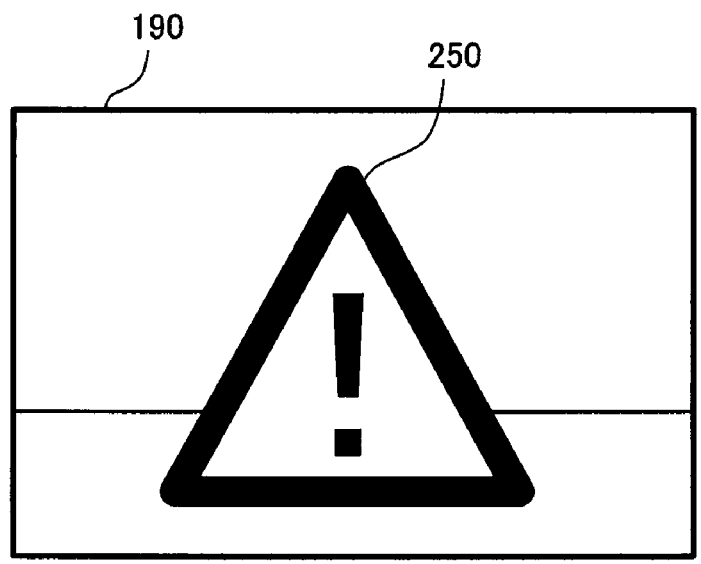
FIG. 10A shows one example of a warning display when a process of detecting the main subject fails in the second framing support mode according to the present embodiment.
Figure 10B:
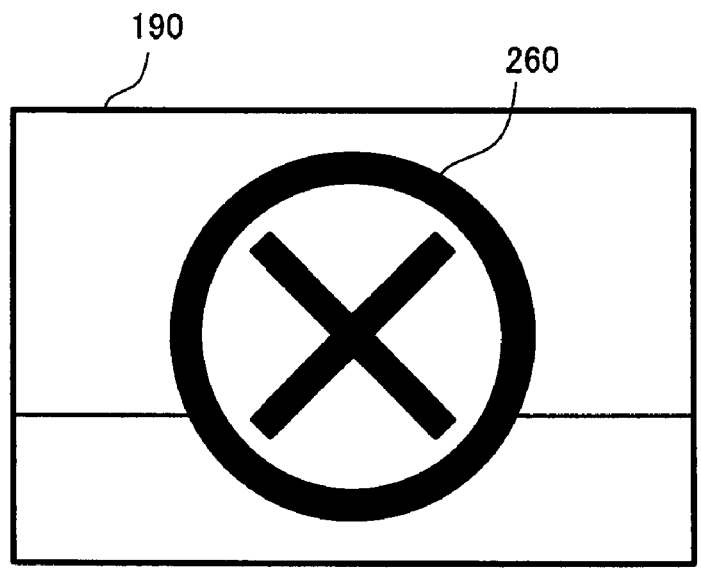
FIG. 10B shows one example of a warning display when a tracking process stops because a process of detecting the main subject fails in the second framing support mode according to the present embodiment.

Further, the second framing support mode may present a warning display as shown in, for example, FIG. 10A and FIG. 10B. To be more specific, FIG. 10A shows one example of a warning display in display section 190 in case where the sight of the main subject is decided to have been lost. Warning display 250 indicating that the sight of the subject is lost is displayed on the screen. Further, in case where the state in which the sight of the main subject is lost continues for a certain period, the tracking process may be configured to be finished and warning display 260 as shown in FIG. 10B may be displayed on the screen. These warning displays 250 and 260 allow users to readily and instantaneously understand whether or not tracking process is being executed, without looking at display section 190.

The content of the operation of the tracking process in the second framing support mode has been explained above.

Here, with the present embodiment, the first framing support mode and the second framing support mode can be switched manually. Using operating section 180, the user can command video camera 100 whether to operate in the first framing support mode or in the second framing support mode. The operation by the user is reported to system control section 160 through operating section 180, and system control section 160 controls each section thereafter such that video camera 100 operates in framing support mode commanded by the user.

As described above, the present embodiment enables shooting in a more flexibile fashion according to the user's intension of shooting.

Embodiment 2

A case will be explained with Embodiment 2 where the first framing support mode and the second framing support mode are automatically switched depending on whether or not the imaging apparatus is currently shooting (i.e. recording).

The video camera as the imaging apparatus according to the present embodiment has the same, basic configuration as corresponding video camera 100 of Embodiment 1 shown in FIG. 2, and the same components will be explained using the same reference numerals.

Characteristics of the present embodiment include deciding whether or not video camera 100 is currently shooting (i.e. recording), and automatically switching the first framing support mode and second framing support mode according to this decision result.

To be more specific, during shooting, video camera 100 operates in the second framing support mode for performing a framing process actively such that shooting does not fail. On the other hand, if video camera 100 is not currently shooting, the second framing support mode for performing a framing process actively is likely to become inconvenient for users, and, first of all, shooting cannot fail in this case, and accordingly it is less necessary to perform a framing process such that the subject does not go out of the frame. Consequently, when video camera 100 is not currently shooting, video camera 100 operates in the first framing support mode such that the user can perform framing as intended.

Whether or not video camera 100 is currently shooting can be decided by checking whether or not recording I/F section 145 currently performs a recording operation in system control section 160.

That is, system control section 160 as the switching section automatically switches to the second framing support mode when video camera 100 is currently shooting (i.e. recording), and automatically switches to the first framing support mode when video camera 100 is not currently shooting (i.e. recording).

As described above, the present embodiment enables shooting in a more flexibile fashion according to the user's intension of shooting while reducing burdens of the operation users take.

Embodiment 3

A case will be explained with Embodiment 3 where the first framing support mode and the second framing support mode are automatically switched depending on whether or not the imaging apparatus is held in a hand.

The video camera as an imaging apparatus according to the present embodiment has the same, basic configuration as corresponding video camera 100 of Embodiment 1 shown in FIG. 2, and the same components will be explained using the same reference numerals.

Characteristics of the present embodiment include deciding whether or not video camera 100 is held in a hand, and automatically switching the first framing support mode and the second framing support mode according to this decision result.

To be more specific, when it is decided that video camera 100 is held in a hand, video camera 100 operates in the first framing support mode taking into account the user's intension. By contrast with this, when it is decided that video camera 100 is not held in a hand and is fixed to, for example, a tripod, video camera 100 operates in the second framing support mode.

The method of deciding whether or not video camera 100 is held in a hand is a known art. For example, DC filters are applied to angular velocity signals in the yawing direction and the pitching direction outputted from motion detecting section 170 to remove low frequency components, and, if the amplitude of each resulting signal exceeds a threshold, it is decided that video camera 100 is held in a hand and, if the amplitude of each resulting signal does not exceed a threshold, it is decided that video camera 100 is not held in a hand.

That is, system control section 160 as the switching section automatically switches to the first framing support mode if video camera 100 is held in a hand, and automatically switches to the second framing support mode if video camera 100 is not held in a hand.

As described above, the present embodiment enables shooting in a more flexible fashion according to the user's intension of shooting while reducing burdens of the operation users take.

Embodiment 4

A case will be explained with Embodiment 4 where the first framing support mode and the second framing support mode are automatically switched depending on whether or not the user holding the imaging apparatus is still.

The video camera as the imaging apparatus according to the present embodiment has the same, basic configuration as corresponding video camera 100 of Embodiment 1 shown in FIG. 2, and the same components will be explained using the same reference numerals.

Characteristics of the present embodiment include deciding whether or not the user holding video camera 100 is still and automatically switching between the first framing support mode and the second framing support mode according to this decision result.

To be more specific, when it is decided that the user is still, video camera 100 operates in the first framing support mode taking into account the user's intension. By contrast with this, when it is decided that the user is not still, for example, when the user is walking, video camera 100 operates in the second framing support mode.

Whether or not the user is still is decided in system control section 160 using angular velocity signals in the yawing direction and in the pitching direction outputted from motion detecting section 170. When the frequency and amplitude of each angular velocity signal exceeds a certain threshold, system control section 160 decides that the user holding video camera 100 is not still.

That is, system control section 160 as the switching section automatically switches to the first framing support mode when the user holding video camera 100 is still, and automatically switches to the second framing support mode when the user holding video camera 100 is not still.

According to the above operation, even in the situation where it is difficult to accommodate the main subject in the shooting area because the user is not still, the second framing support mode is validated, so that it is possible to reduce the possibility of shooting failure.

Embodiment 5

A case will be explained with Embodiment 5 where the first framing support mode and the second framing support mode are automatically switched depending on whether or not self-portrait is taken.

The video camera as the imaging apparatus according to the present embodiment has the same, basic configuration as corresponding video camera 100 of Embodiment 1 shown in FIG. 2, and the same components will be explained using the same reference numerals.

Characteristics of the present embodiment include deciding whether or not the portrait of the user is taken by the imaging apparatus (i.e. video camera 100) held in a hand of the user, that is, whether or not a self-portrait is taken, and automatically switching between the first framing support mode and the second framing support mode according to this decision result.

To be more specific, when it is decided that a self-portrait is not taken, video camera 100 operates in the first framing support mode, and, if it is decided that a self-portrait is taken, video camera 100 operates in the second framing support mode. When a self-portrait is taken, it is difficult to set framing compared to normal shooting, video camera 100 operates in the second framing support mode that performs control to change framing.

As the method of deciding whether or not a self-portrait is taken, there is a method of detecting the rotation of display section 190.

Figure 11:
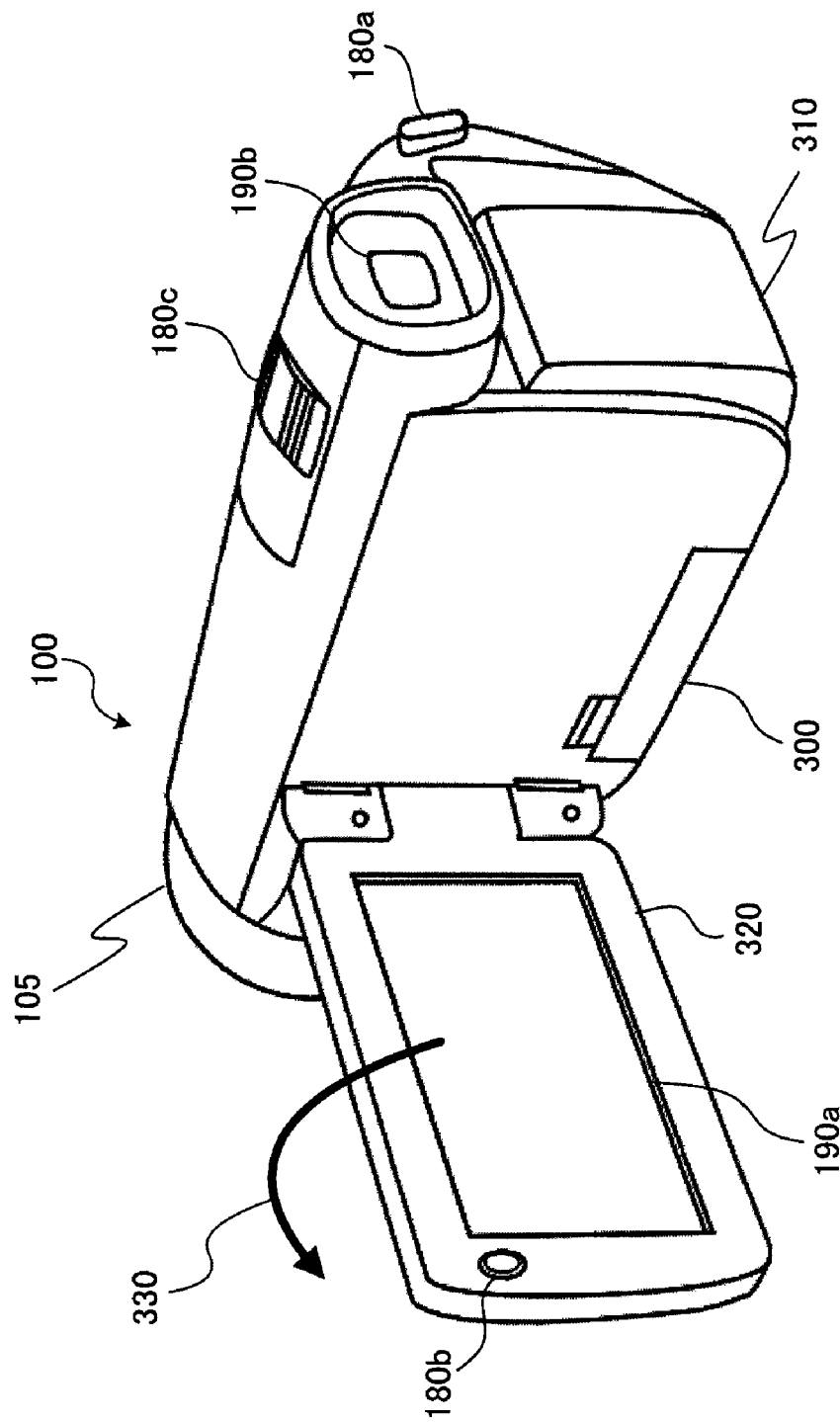
FIG. 11 is a perspective view showing an outlook of the video camera shown in FIG. 2.

FIG. 11 is a perspective view showing an outlook of video camera 100 shown in FIG. 2.

In FIG. 11, button 180a is the recording button for commanding start and stop of recording. Button 180b is the tracking button for commanding start and stop of a subject detection process and tracking process. Button 180c is a zoom lever for zooming.

Opening/closing panel 300 protects socket 150 in which recording medium 195 is inserted. The user opens opening/closing panel 300 to insert recording medium 195. Battery 310 supplies the power required to drive video camera 100.

Both LCD190a and EVF190b form display section 190. LCD190a is attached to LCD rotating section 320. LCD rotating section 320 is configured to be rotatable in the direction indicated by arrow 330. When LCD rotating section 320 rotates and then LCD 190a and optical system 105 face virtually the same direction, this is reported to system control section 160 from rotation detecting section 175.

When rotation detecting section 175 detects the rotation of LCD 190a, system control section 160 decides that self-portrait is set, and automatically switches mode from the first framing support mode to the second framing support mode.

As described above, the present embodiment enables shooting in a more flexibile fashion according to the user's intension of shooting while reducing burdens of the operation users take.

Further, with the present embodiment, the user may look at display section 190 and therefore only framing control may be performed such that various warning displays shown in FIG. 9, FIG. 10A and FIG. 10B are not displayed.

Further, as a modified example of the present embodiment, an imaging apparatus configured to rotate optical system 105 instead of display section 190 can perform similar mode switching with a similar configuration. In this case, rotation detecting section 175 detects the rotation of optical system 105.

Embodiment 6

A case will be explained with Embodiment 6 where the third framing support mode is provided in addition to the first framing support mode and the second framing support mode.

The video camera as the imaging apparatus according to the present embodiment has the same, basic configuration as corresponding video camera 100 of Embodiment 1 shown in FIG. 2, and the same components will be explained using the same reference numerals.

Characteristics of the present embodiment include providing an option of the third framing support mode in addition to the first framing support mode and the second framing support mode. The third framing support mode refers to mode for, in addition to framing control executed in the second framing aid, automatically performing zoom control of optical system 105 such that the proportion of the main subject occupying the shooting area has a certain size, that is, such that the main subject maintains this certain size in the screen. Which one of the first to third framing support mode is used to operate video camera 100 is specified by the user using operating section 180.

When video camera 100 operates in the third framing support mode, system control section 160 calculates the direction of zooming and the degree of zooming, to magnify the main subject to a certain size, based on the result of main subject detection acquired from tracking processing section 155, and report the direction of zooming and the degree of zooming as zoom control information, to lens controlling section 167. Lens controlling section 167 drives the zoom lens and focus lens of optical system 105 based on the zoom control information reported from system control section 160.

As described above, the number of framing support modes increases, so that the present embodiment enables shooting in a much more flexibile fashion according to the user's intension of shooting.

Preferable embodiments of the present invention have been explained above.

Further, the present invention is not limited to the above embodiments, and it naturally follows that the present invention can be variously modified within the scope that does not deviate from the spirit of the present invention. Particularly, although, with the above-embodiments, the number of framing support modes is two or three, the present invention is not limited to this. The number of framing support modes and a group of shooting functions executed in each framing support mode can be variously changed. Further, a configuration is possible where, in order to enable shooting further according to the user's intension of shooting, each shooting function that is executed based on the result of subject detection may be validated or invalidated.

Figure 12:
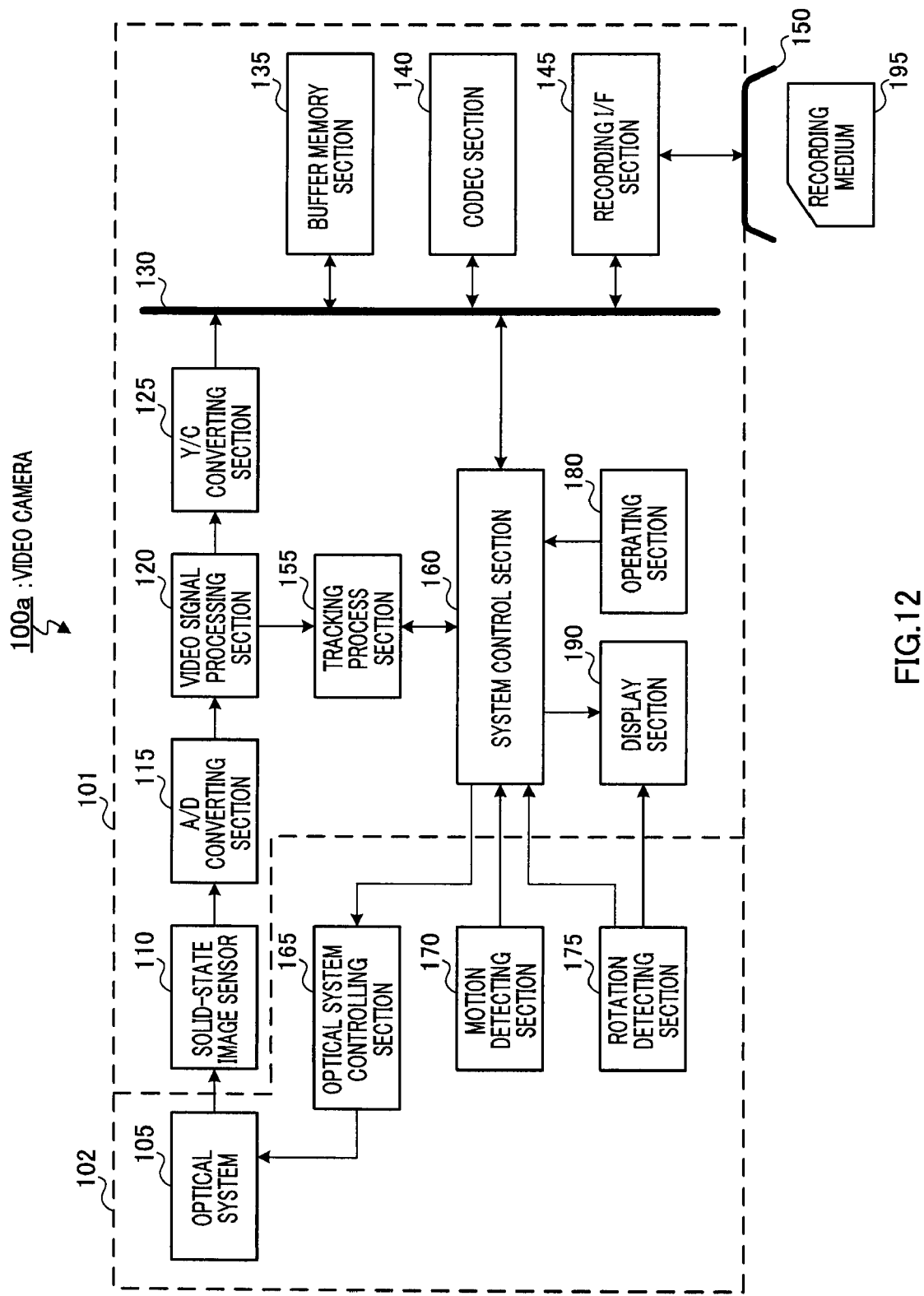
FIG. 12 is a block diagram showing one modified example of the configuration of the video camera shown in FIG. 2.

Furthermore, as one modified example of the configuration shown in FIG. 2, the above embodiments are applicable to imaging apparatus with replacable lens 100a (here, video camera) shown in FIG. 12. Video camera with replacable lens 100a is formed with camera body 101 and lens unit 102 that are separable. As shown in FIG. 12, camera body 101 has solid-state image sensor 110, A/D converting section 115, video signal processing section 120, Y/C converting section 125, system bus 130, buffer memory section 135, codec section 140, recording I/F section 145, socket 150, tracking processing section 155, system control section 160, operating section 180 and display section 190, and lens unit 102 has optical system 105, optical system controlling section 165, motion detecting section 170 and rotation detecting section 175.

INDUSTRIAL APPLICABILITY

This apparatus can switch shooting functions that are executed based on a result of main subject detection and, consequently, enables shooting in a more flexible fashion according to the user's intension of shooting, and is useful as various imaging apparatuses.

REFERENCE SIGNS LIST 100, 100a VIDEO CAMERA
101 CAMERA BODY
102 LENS UNIT
105 OPTICAL SYSTEM
110 SOLID-STATE IMAGE SENSOR
115 A/D CONVERTING SECTION

120 VIDEO SIGNAL PROCESSING SECTION
125 Y/C CONVERTING SECTION
130 SYSTEM BUS
135 BUFFER MEMORY SECTION
140 CODEC SECTION
145 RECORDING I/F SECTION
150 SOCKET
155 TRACKING PROCESS SECTION
160 SYSTEM CONTROL SECTION
165 OPTICAL SYSTEM CONTROLLING SECTION
166 APERTURE CONTROLLING SECTION
167 LENS CONTROLLING SECTION
168 LENS BARREL CONTROLLING SECTION
170 MOTION DETECTING SECTION
175 ROTATION DETECTING SECTION
180 OPERATING SECTION
180a RECORDING BUTTON
180b TRACKING BUTTON
180c ZOOM LEVER
190 DISPLAY SECTION
190a LCD
190b EVF
195 RECORDING MEDIUM
200 MAIN SUBJECT
210 SPECIFYING FRAME
220 TRACKING FRAME
230, 240, 250, 260 WARNING DISPLAY
300 OPENING/CLOSING PANEL
310 BATTERY
320 LCD ROTATING SECTION

The invention claimed is:

1. An imaging apparatus comprising:
an optical system that forms an optical image of a subject field and can vary a magnification of the optical image;
an imaging section that converts the optical image formed by the optical system, into an electrical image signal;
a display section that displays an image taken by the imaging section;
a subject detecting section that detects a main subject in the image taken by the imaging section;
a framing controlling section that controls framing based on information about a position of the main subject detected in the subject detecting section;
a controlling section that selectively executes one of a first framing support mode that presents on the display section a display that supports the framing based on the information about the position of the main subject detected in the subject detecting section, and a second framing support mode that operates the framing controlling section based on the information about the position of the main subject detected in the subject detecting section; and
a switching section that switches between the first framing support mode and the second framing support mode.

2. The imaging apparatus according to claim 1, further comprising:
an automatic focus adjustment controlling section that performs automatic focus adjustment control; and
an automatic exposure controlling section that performs automatic exposure control,
wherein an automatic focus adjustment process and an automatic exposure process are performed based on the information about the position of the main subject detected in the subject detecting section.

3. The imaging apparatus according to claim 1, wherein, when executing the first framing support mode, the controlling section presents on the display section a direction in which the main subject is anticipated to go out of the display range of the display section if the main subject is about to go out of a display range of the display section.

4. The imaging apparatus according to claim 1, wherein the framing controlling section changes the framing to prevent the main subject from leaving from a display range of the display section.

5. The imaging apparatus according to claim 4, wherein the framing controlling section changes the framing according to a direction in which the main subject moves, such that the main subject is positioned in virtually a center of the display range of the display section.

6. The imaging apparatus according to claim 1, wherein, when executing the second framing support mode, the controlling section presents on the display section a predetermined warning display if the main subject is about to go out of a display range of the display section.

7. The imaging apparatus according to claim 1, wherein, when executing the second framing support mode, the controlling section presents on the display section a predetermined warning display when a sight of the main subject is lost.

8. The imaging apparatus according to claim 1, wherein, when executing the second framing support mode, the controlling section presents on the display section a predetermined warning display when a sight of the main subject is lost and thus an operation of the subject detecting section is finished.

9. The imaging apparatus according to claim 1, further comprising an operating section that receives as input an operation by a user,
wherein the switching section switches between the first framing support mode and the second framing support mode according to the operation of the operating section by the user.

10. The imaging apparatus according to claim 9, wherein:
in addition to the first framing support mode and the second framing support mode, the controlling section can selectively execute a third framing support mode of performing zoom control of the optical system, such that the main subject is magnified to a certain size in a display range of the display section; and
the switching section switches between the first framing support mode, the second framing support mode and the third framing support mode according to the operation of the operating section by the user.

11. The imaging apparatus according to claim 1, further comprising a recording section that records the image taken by the imaging section,
wherein the switching section automatically switches to the first framing support mode when the recording section is not performing a recording operation, and automatically switches to the second framing support mode when the recording section is performing the recording operation.

12. The imaging apparatus according to claim 1, further comprising a motion detecting section that detects a motion of the imaging apparatus,
wherein the switching section switches between the first framing support mode and the second framing support mode according to the motion of the imaging apparatus detected by the motion detecting section.

13. The imaging apparatus according to claim 12, further comprising a hand-hold deciding section that decides whether or not the imaging apparatus is held by a user, based on an output of the motion detecting section, when the hand-hold deciding section decides that the imaging apparatus is held by the user, the switching section automatically switches to the first framing support mode.

14. The imaging apparatus according to claim 12, further comprising a motionlessness deciding section that decides whether or not a user holding the imaging apparatus is sill, based on an output of the motion detecting section, wherein, when the motionlessness deciding section decides that the user holding the imaging apparatus is still, the switching section automatically switches to the first framing support mode.

15. The imaging apparatus according to claim 1, wherein:

one of the optical system and the display section is configured to be rotatable;

the imaging apparatus comprises a rotation detecting section that detects rotation of one of the optical system and the display section; and when the rotation detecting section detects that orientations of the optical system and the display section face virtually a same direction, the switching section automatically switches to the second framing support mode.

* * * * *